(12) United States Patent
Mederer

(10) Patent No.: US 8,312,855 B2
(45) Date of Patent: Nov. 20, 2012

(54) MASS BALANCING DEVICE FOR A RECIPROCATING PISTON INTERNAL COMBUSTION ENGINE

(75) Inventor: Tobias Mederer, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 376 days.

(21) Appl. No.: 12/672,567

(22) PCT Filed: Jul. 18, 2008

(86) PCT No.: PCT/EP2008/059445
§ 371 (c)(1),
(2), (4) Date: Feb. 8, 2010

(87) PCT Pub. No.: WO2009/019122
PCT Pub. Date: Feb. 12, 2009

(65) Prior Publication Data
US 2011/0155089 A1    Jun. 30, 2011

(30) Foreign Application Priority Data

Aug. 7, 2007    (DE) .......................... 10 2007 037 287

(51) Int. Cl.
*F02B 75/06* (2006.01)
(52) U.S. Cl. ...................................... 123/192.2; 74/603
(58) Field of Classification Search ............... 123/192.2; 74/603
See application file for complete search history.

(56) References Cited

U.S. PATENT DOCUMENTS

| | | | | |
|---|---|---|---|---|
| 2,914,963 | A | * | 12/1959 | Scherenberg ................... 74/604 |
| 3,511,110 | A | * | 5/1970 | Grieve ........................ 123/192.2 |
| 5,375,571 | A | * | 12/1994 | Diehl et al. ................. 123/192.2 |
| 6,286,474 | B1 | * | 9/2001 | Downs et al. .............. 123/192.2 |

FOREIGN PATENT DOCUMENTS

| | | |
|---|---|---|
| DE | 2822589 | 11/1979 |
| EP | 0789166 | 8/1997 |
| EP | 1775484 | 4/2007 |

* cited by examiner

*Primary Examiner* — Noah Kamen
(74) *Attorney, Agent, or Firm* — Volpe and Koenig, P.C.

(57) ABSTRACT

A mass balancing device (1*a*, 1*b*) for a reciprocating piston internal combustion engine is provided, having a first balancing shaft (2*a*, 2*b*) and a second balancing shaft (3*a*, 3*b*) disposed in the first balancing shaft coaxially thereto. The first balancing shaft (2*a*, 2*b*) has at least one bearing point (6*a*, 7*a*, 6*b*, 7*b*) for a first rolling bearing (16) and the second balancing shaft (3*a*, 3*b*) has at least one bearing point (8*a*, 9*a*, 8*b*, 9*b*) for a second rolling bearing (17). The rolling bearings radially support the balancing shafts in the reciprocating piston internal combustion engine. At least one of the bearing locations is designed as a hollow cylinder having an outer shell surface serving as the bearing seat for the first rolling bearing and an inner shell surface serving as the bearing seat for the second rolling bearing, such that the first rolling bearing and the second rolling bearing overlap one another axially.

10 Claims, 2 Drawing Sheets

MASS BALANCING DEVICE FOR A RECIPROCATING PISTON INTERNAL COMBUSTION ENGINE

BACKGROUND

The invention relates to a mass-balancing device for a reciprocating-piston internal combustion engine. The mass-balancing device comprises a first balancing shaft and a second balancing shaft that is arranged in the first balancing shaft coaxial to this first balancing shaft and that rotates in the opposite sense, wherein the first balancing shaft has at least one bearing point for a first roller bearing and wherein the second balancing shaft has at least one bearing point for a second roller bearing, with the balancing shafts being supported radially in the reciprocating-piston internal combustion engine by these roller bearings.

Such a mass-balancing device emerges from DE 28 22 589 A1, which is considered to be class-forming. The coaxial arrangement of the nested balancing shafts does indeed allow an especially compact construction of the mass-balancing device in the radial direction in comparison with a construction with axis-offset balancing shafts, which is typical in practice, but the technical implementation of the arrangement proposed in the cited publication would have considerable axial structural space requirements. This is based essentially in that all of the roller bearings are allocated to only one or the other balancing shaft and consequently must be arranged one next to the other in the axial direction for corresponding extra requirements for structural space in the axial direction.

SUMMARY

The present invention is therefore based on the objective of improving a mass-balancing device of the type noted above so that the mass-balancing device could be constructed as compact as possible not only in the radial direction, but also in the axial direction.

This objective is achieved according to the invention. Consequently, at least one of the bearing points should be constructed with a hollow-cylindrical construction with an outer lateral surface used as the bearing seat or inner raceway for the first roller bearing and with an inner lateral surface used as a bearing seat or outer raceway for the second roller bearing, such that the first roller bearing and the second roller bearing overlap axially to a large extent or completely. The axial structural space requirements of the mass-balancing gear, which are lower in comparison with the cited state of the art, are based, in other words, on a series arrangement of the roller bearings in the radial direction. In this way, because one of the roller bearings must always also transfer the loading of the other roller bearing, the roller bearings are obviously to be dimensioned according to these specific load ratios.

The radial structural requirements of the mass-balancing device, which are possibly increased due to the series arrangement of the roller bearings, can be held within tight limits in one refinement of the invention, such that the first roller bearing and/or the second roller bearing are constructed as needle-roller and cage assemblies. The needle-roller and cage assembly is known to someone skilled in the art of roller-bearing technology as a ring-less needle bearing that consequently saves, in particular, structural space in the radial direction and that is made from a cage and needle rollers inserted in this cage.

In particular, in the case of a radial two-compartment bearing of the mass-balancing device, it is consequently provided with respect to the minimal axial structural space requirements that the first balancing shaft and the second balancing shaft each have two of the bearing points according to the invention. In addition, in this way at least one of the balancing shafts should have an unbalanced section connecting the two bearing points, with this unbalanced section having an essentially circular-ring-segment-shaped cross section. An unbalanced section of the balancing shaft shaped in this way takes into account not only the necessary free rotational travel relative to the other balancing shaft, but also offers a large potential in terms of lightweight construction, because naturally the circular-ring-segment-shaped cross section, for one, has an eccentric center of gravity and, second, is free from a non-unbalanced mass on the axis of the balancing shaft. In addition, a geometrically simple and production-ready construction of such a balancing shaft is then given if the cross section of the unbalanced section is constructed uniformly across its entire axial extent.

In a first construction of the invention with respect to the radial support of the balancing shafts, the reciprocating-piston internal combustion engine should have a housing bearing seat enclosing the first roller bearing for supporting the balancing shafts, wherein the bearing point of the first balancing shaft is constructed with a hollow-cylindrical construction with the outer lateral surface used as a bearing seat or inner raceway for the first roller bearing and with the inner lateral surface used as a bearing seat or outer raceway for the second roller bearing. Under the prerequisite of a suitable material and surface condition of the housing bearing seat, it could be provided here, in particular, for the use of the previously mentioned needle-roller and cage assembly as a first roller bearing that the housing bearing seat is used as an outer raceway for the first roller bearing.

In an alternative second construction with respect to the radial support of the balancing shafts, the reciprocating-piston internal combustion engine should have a bearing pin enclosed by the second roller bearing for supporting the balancing shafts, wherein the bearing point of the second balancing shaft is constructed with a hollow-cylindrical construction with the outer lateral surface used as a bearing seat or inner raceway for the first roller bearing and with the inner lateral surface used as a bearing seat or outer raceway for the second roller bearing. While this alternative construction of the invention somewhat involves a kinematically inverted support of the balancing shafts, the bearing pin could be used as the inner raceway for the second roller bearing analogous to the housing bearing seat constructed as an outer raceway for the first roller bearing.

For driving and for generating the opposite rotation of the balancing shafts, it is further provided that the balancing shafts are each provided with cylindrical gear teeth, wherein one set of cylindrical gear teeth mesh directly with a drive wheel and the other set of cylindrical gear teeth mesh with the drive wheel via an intermediate gearwheel.

Finally, the constructions noted above should be combined with each other in an arbitrary way, if technically possible and useful.

BRIEF DESCRIPTION OF THE DRAWINGS

Additional features of the invention result from the following description and the drawings in which embodiments of the invention are shown in a simplified form. If not mentioned otherwise, identical or functionally identical features or components are here provided with identical reference numbers. Shown are.

DETAILED DESCRIPTION OF THE PREFERRED EMBODIMENTS

Figure 1:
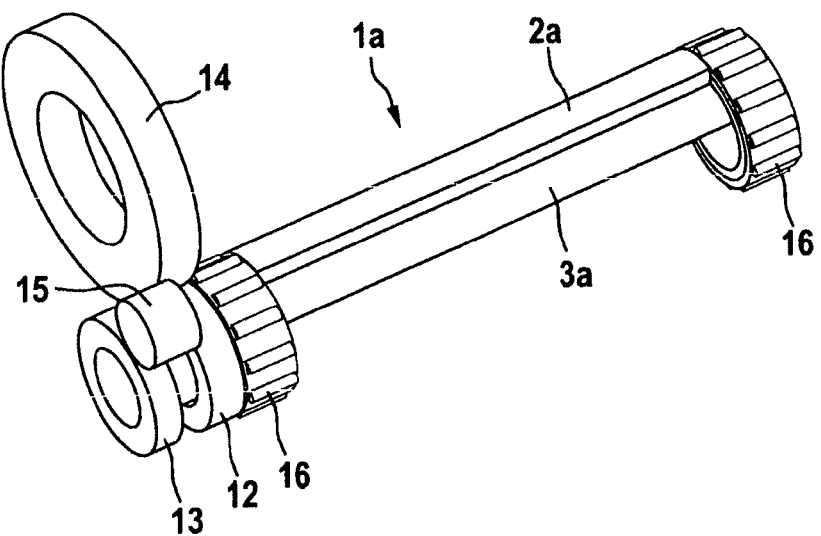
FIG. 1 a first embodiment of a mass-balancing device according to the invention in a simplified, perspective diagram, FIG. 2 the mass-balancing device according to FIG. 1 in a longitudinal section, and FIG. 3 a second embodiment of a mass-balancing device according to the invention in a simplified, perspective diagram.
Figure 2:
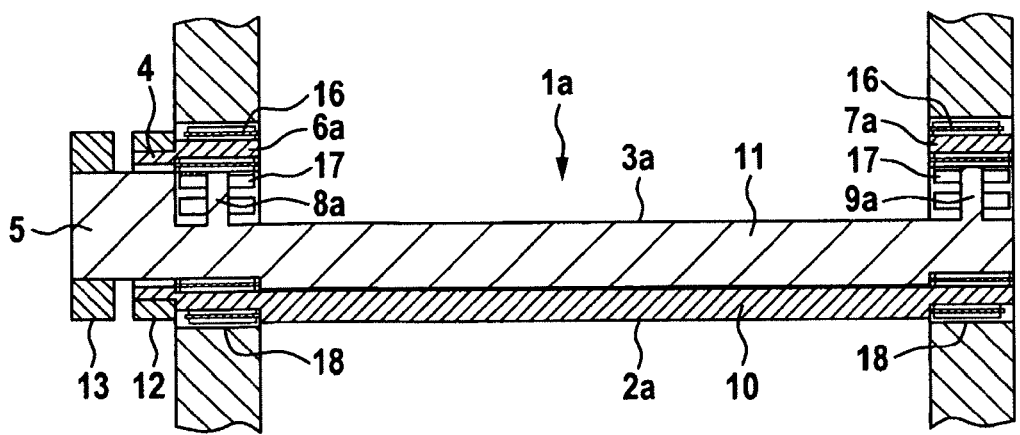

In FIGS. 1 and 2, a first embodiment of a mass-balancing device 1a according to the invention for a reciprocating-piston internal combustion engine is shown in a perspective diagram and in longitudinal section. A first balancing shaft 2a and a second balancing shaft 3a arranged coaxially within this first balancing shaft are shown, wherein the balancing shafts 2a and 3a here rotate in opposite directions for balancing free mass forces of a second order of a 4-cylinder inline engine with twice the crankshaft rotational speed. The balancing shafts 2a and 3a each comprise a drive section 4 and 5, respectively, two radial bearing points 6a and 7a and 8a and 9a, respectively, and also an unbalanced section 10 and 11, respectively, that extend between the two bearing points 6a, 7a and 8a, 9a, respectively. Here, the balancing shafts 2a, 3a are constructed so that the contributions of the unbalanced masses generated by these shafts are equal in size.

Figure 3:
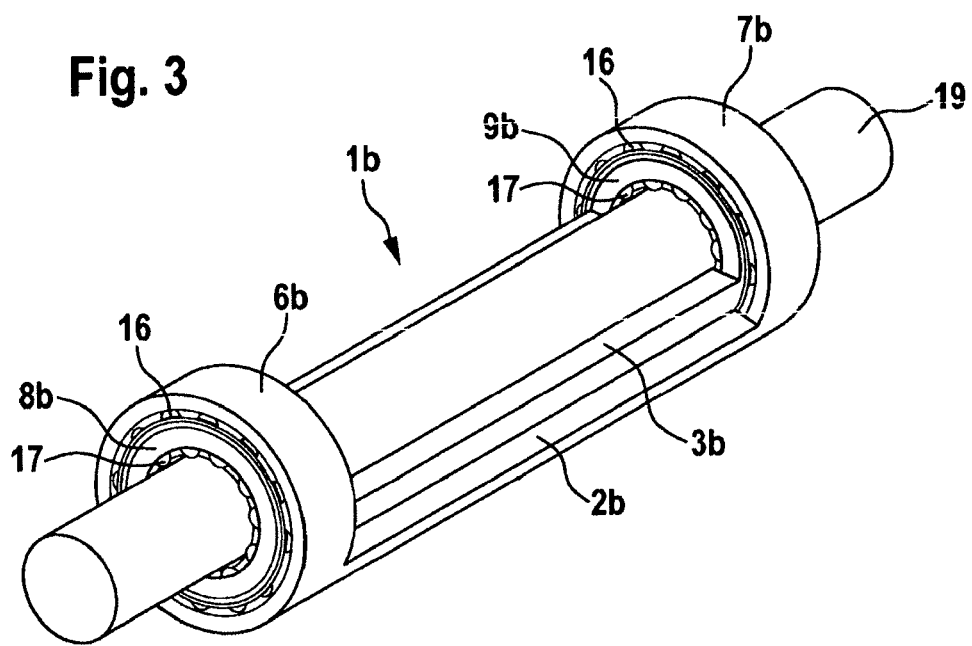

Both drive sections 4, 5 are provided with a cylindrical gear teeth 12 and 13, respectively, wherein, for generating the opposite rotation, the cylindrical gear teeth 12 of the first balancing shaft 2a mesh directly with a drive wheel 14 and the cylindrical gear teeth 13 of the second balancing shaft 3a mesh indirectly via an intermediate gearwheel 15 with the drive wheel 14. Independent of whether the drive wheel 14 is arranged on the crankshaft of the reciprocating-piston internal combustion engine or even the intermediate wheel driven by the crankshaft, the transmission ratio between the crankshaft and the cylindrical gearwheels 12, 13 equals 1:2. An axial support of the balancing shafts 2a, 2b is obviously also provided, but not included in any of FIGS. 1 to 3 for reasons of simplified diagrams.

As is clear especially from FIG. 2, the bearing points 6a and 8a, as well as 7a and 9a, are each connected radially inline to form a bearing-point pair. For the radial support of the balancing shafts 2a, 3a, first roller bearings 16 and second roller bearings 17 are used that are allocated to the bearing points 6a, 7a of the first balancing shaft 2a and to the bearing points 8a, 9a of the second balancing shaft 3a, respectively, and that here completely overlap in the axial direction according to the radial inline connection of the bearing points 6a and 8a and 7a and 9a, respectively. Both the first and also the second roller bearings 16 and 17 are each constructed as needle-roller and cage assemblies made from a cage and needles arranged in this cage.

In the case of this embodiment of the mass-balancing device 1a, the balancing shafts 2a, 3a are supported in housing bearing seats 18 enclosing each first roller bearing 16 in the reciprocating-piston internal combustion engine. The housing bearing seats 18 are used as the outer raceway and the outer lateral surfaces of the hollow-cylindrical bearing points 6a, 7a of the first balancing shaft 2a are used as the inner raceway for the first roller bearing 16. Analogously, the inner lateral surfaces of the bearing points 6a, 7a are used as the outer raceway and the outer lateral surfaces of the bearing points 8a, 9a are used as the inner raceway for the second roller bearing 17.

In FIG. 2 it can be seen further that the bearing points 8a, 9a of the second balancing shaft 3a have widths that vary across their extent. Such a construction of balancing shaft bearing points is known as such in the state of the art from EP 1 775 484 A2 and can be reduced in width or completely removed, based on the idea of a slightly or not-at-all loaded peripheral section of a bearing point loaded merely with a point load due to the unbalanced mass, without negatively affecting the function of the roller bearing allocated to the bearing point.

As also emerges from FIGS. 1 and 2, the unbalanced section 10 of the first balancing shaft 2a has a cross section that is uniform across its entire axial extent and that here has a circular-ring-segment shape. In the case of the mass-balancing device 1b shown in FIG. 3, this relates not only for an outer first balancing shaft 2b, but also for an inner second balancing shaft 3b. This second embodiment of the invention differs from the mass-balancing device 1a essentially by the structural form of the radial support of the balancing shafts 2b, 3b in the reciprocating-piston internal combustion engine and is, to a certain extent, a kinematic reversal of the radial support according to FIGS. 1 and 2. In this case, the reciprocating-piston internal combustion engine has a stationary bearing pin 19 that is enclosed by the second roller bearings 17 constructed here also as needle-roller and cage assemblies and is used as the inner raceway for these. Their outer raceway is formed by the inner lateral surface of two hollow cylindrical bearing points 8b and 9b of the second balancing shaft 3b. The outer lateral surfaces of these bearing points 8b, 9b are each used as the inner raceway for the first roller bearings 16 that are enclosed on their side by hollow cylindrical bearing points 6b and 7b of the first balancing shaft 2b.

LIST OF REFERENCE SYMBOLS 1a,b Mass-balancing device
2a,b First balancing shaft
3a,b Second balancing shaft
4 Drive section of the first balancing shaft
5 Drive section of the second balancing shaft
6a,b Bearing point of the first balancing shaft
7a,b Bearing point of the first balancing shaft
8a,b Bearing point of the second balancing shaft
9a,b Bearing point of the second balancing shaft
10 Unbalanced section of the first balancing shaft
11 Unbalanced section of the second balancing shaft
12 Cylindrical gear teeth of the first balancing shaft
13 Cylindrical gear teeth of the second balancing shaft
14 Drive wheel
15 Intermediate gearwheel
16 First roller bearing
17 Second roller bearing
18 Housing bearing seat
19 Bearing pin

The invention claimed is:

1. Mass-balancing device for a reciprocating-piston internal combustion engine, comprising a first balancing shaft and a second balancing shaft that is arranged in the first balancing shaft coaxial to the first balancing shaft and that rotates in an opposite direction, the first balancing shaft has at least one bearing point for a first roller bearing and the second balancing shaft has at least one bearing point for a second roller bearing, the first and second balancing shafts are supported radially by the first and second roller bearings in the reciprocating-piston internal combustion engine, at least one of the bearing points has a hollow cylindrical construction with an outer lateral surface used as a bearing seat or inner raceway for the first roller bearing and with an inner lateral surface used as a bearing seat or outer raceway for the second roller bearing, such that the first roller bearing and the second roller bearing overlap in an axial direction to a large extent or completely.

2. Mass-balancing device according to claim 1, wherein at least one of the first roller bearing or the second roller bearing is constructed as needle-roller and cage assemblies.

3. Mass-balancing device according to claim 1, wherein the first balancing shaft and the second balancing shaft each have two of the bearing points.

4. Mass-balancing device according to claim 3, wherein at least one of the balancing shafts has an unbalanced section with an essentially circular-ring-segment-shaped cross section connecting the bearing points.

5. Mass-balancing device according to claim 4, wherein the cross section of the unbalanced section is constructed uniformly across an entire axial extent.

6. Mass-balancing device according to claim 1, wherein the reciprocating-piston internal combustion engine has a housing bearing seat enclosing the first roller bearing for supporting the balancing shafts, the bearing point of the first balancing shaft has a hollow cylindrical construction with an outer lateral surface used as a bearing seat or inner raceway for the first roller bearing and with an inner lateral surface used as a bearing seat or outer raceway for the second roller bearing.

7. Mass-balancing device according to claim 6, wherein the housing bearing seat is used as the outer raceway for the first roller bearing.

8. Mass-balancing device according to claim 1, wherein the reciprocating-piston internal combustion engine has a bearing pin enclosed by the second roller bearing for supporting the balancing shafts, the bearing point of the second balancing shaft has a hollow cylindrical construction with the outer lateral surface used as a bearing seat or inner raceway for the first roller bearing and with the inner lateral surface used as a bearing seat or outer raceway for the second roller bearing.

9. Mass-balancing device according to claim 8, wherein characterized in that the bearing pin is used as an inner raceway for the second roller bearing.

10. Mass-balancing device according to claim 1, wherein the balancing shafts are each provided with cylindrical gear teeth, and one set of the cylindrical gear teeth mesh directly with a drive wheel and the other set of the cylindrical gear teeth mesh with the drive wheel via an intermediate gearwheel.

\* \* \* \* \*